(12) United States Patent
Song et al.

(10) Patent No.: US 8,231,936 B2
(45) Date of Patent: Jul. 31, 2012

(54) METHODS OF REDUCING CORROSION BETWEEN MAGNESIUM AND ANOTHER METAL

(75) Inventors: Guangling Song, Troy, MI (US); Aihua A. Luo, Troy, MI (US); Xiaohong Q. Gayden, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 716 days.

(21) Appl. No.: 12/331,885

(22) Filed: Dec. 10, 2008

(65) Prior Publication Data

US 2010/0143746 A1     Jun. 10, 2010

(51) Int. Cl.
*B05D 1/06* (2006.01)
*B05D 1/36* (2006.01)

(52) U.S. Cl. ........ 427/191; 427/190; 427/201; 427/427; 427/142

(58) Field of Classification Search .................. 427/180, 427/190, 191, 201, 421.1, 427, 142
See application file for complete search history.

(56) References Cited

U.S. PATENT DOCUMENTS

| | | | |
|---|---|---|---|
| 3,979,351 | A | 9/1976 | Sekhon |
| 3,983,304 | A | 9/1976 | Sekhon |
| 4,078,712 | A | 3/1978 | Cook et al. |
| 5,322,740 | A | 6/1994 | Ghosh |
| 6,149,049 | A | 11/2000 | Loftfield et al. |
| 6,450,396 | B1 | 9/2002 | Krajewski |
| 6,833,164 | B2 | 12/2004 | Liu |
| 7,066,375 | B2 | 6/2006 | Bolser |
| 7,455,881 | B2* | 11/2008 | Raybould et al. ............. 427/203 |
| 2003/0219542 | A1* | 11/2003 | Ewasyshyn et al. .......... 427/421 |
| 2005/0173495 | A1 | 8/2005 | Wastiaux et al. |
| 2007/0241164 | A1 | 10/2007 | Barnes et al. |

FOREIGN PATENT DOCUMENTS

| | | |
|---|---|---|
| DE | 10222284 | 12/2003 |
| DE | 102004059008 | 6/2006 |
| DE | 102008027491 | 12/2009 |

* cited by examiner

*Primary Examiner* — Frederick Parker
(74) *Attorney, Agent, or Firm* — Dierker & Associates, P.C.

(57) ABSTRACT

Methods of reducing corrosion between magnesium and another metal are disclosed herein. In one method, a corrosion protection material is cold sprayed at an interface formed between the magnesium and the other metal, the corrosion protection material including magnesium. In another method, a cladding layer is applied to heat affected areas of the magnesium and/or the other metal, at a welded joint, or combinations thereof.

9 Claims, 2 Drawing Sheets

METHODS OF REDUCING CORROSION BETWEEN MAGNESIUM AND ANOTHER METAL

TECHNICAL FIELD

The instant disclosure relates generally to methods of reducing corrosion between magnesium and another metal.

BACKGROUND

Magnesium has been discovered as a promising alternative to aluminum in many applications. For example, magnesium may be used for structural parts in automotive and/or aerospace applications. This is due, at least in part, to magnesium's relatively high strength-to-weight ratio, as compared to aluminum. In some instances, a part made from magnesium may be joined to a part made from another metal and/or another metal may be used to join together two magnesium parts. In either case, the magnesium part(s) may be susceptible to wear and corrosion at an interface formed between the magnesium and the other metal when, for example, the interface is exposed to corrosive environments.

SUMMARY

Methods of reducing corrosion between magnesium and another metal are disclosed herein. In one method, corrosion at an interface formed between at least one of a fastener and a magnesium part, or a part associated with the fastener and the magnesium part, is reduced by cold spraying a corrosion protection material at least at the interface, the corrosion protection material including at least magnesium.

In another method, corrosion at an interface formed between a magnesium-containing metal and another metal is reduced by: welding the magnesium and the other metal together to form i) a welded joint between them, and ii) at least one heat affected area adjacent the welded joint, wherein portions of the at least one heat affected area include a mixed composition of the magnesium-containing metal and the other metal; and applying a cladding layer to at least one of i) a surface of the magnesium proximate the at least one heat affected area, ii) a surface of the other metal proximate the at least one heat affected area, or iii) combinations thereof, wherein the cladding layer hinders corrosion of at least one of the magnesium or the other metal.

BRIEF DESCRIPTION OF THE DRAWINGS

Features and advantages the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Galvanic corrosion often occurs at an interface formed between dissimilar metals when the interface is exposed to corrosive environments. "Corrosive environments," as used herein, refers to any environment including a corrosive species which, upon exposure thereto, will cause or at least commence corrosion of a metal. Non-limiting examples of corrosive species include water, salt, acids, aqueous solutions containing oxygen, aqueous solutions containing chlorides, and the like.

Galvanic corrosion occurs when the dissimilar metals are electrically connected to each other and are exposed to an electrolyte (i.e., a corrosive species). Upon exposure to the electrolyte, the dissimilar metals assume different corrosion potentials that tend to cause galvanic current to flow between the metals. In most cases, the less noble metal will act like an anode, and the more noble metal will act like a cathode. The galvanic current flows from the anode to the cathode, and, in some instances, causes electrochemical dissolution of the anodic metal.

Embodiment(s) of the methods disclosed herein advantageously reduce corrosion at the interface formed between dissimilar metals. More specifically, the method(s) reduce corrosion at an interface formed between magnesium and another metal such as, e.g., steel, galvanized steel, zinc alloys, aluminum alloys, copper alloys, and/or the like. This is accomplished by coating or otherwise covering at least the exposed portion of the interface between the metals with a material that has substantially the same composition as the metal or metals that the material is coating or covering. Reduced corrosion of the metal(s) at the interface advantageously improves the strength of the joined metals, thereby improving their useful life.

Figure 1:
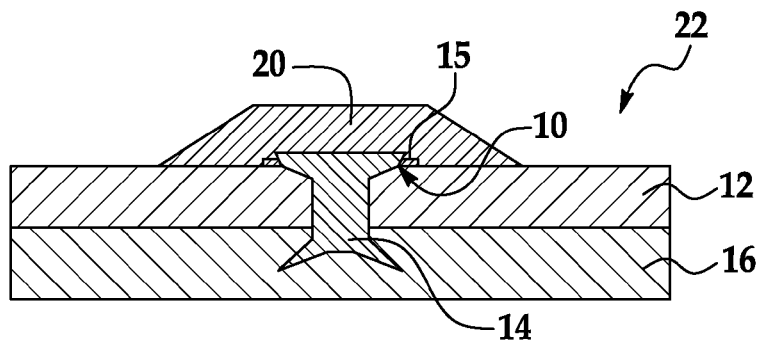
FIG. 1 is a semi-schematic, cross-sectional view of an example of a method of reducing corrosion at an interface formed between magnesium and another metal.

One example of the method disclosed herein is generally depicted in FIG. 1. In this example, corrosion is reduced at an interface 10 formed between a magnesium part 12 and a fastener 14 (formed from a metal other than magnesium) when the interface 10 is exposed to a corrosive environment.

In the example shown in FIG. 1, the fastener 14 is used to join the magnesium part 12 to another part 16. In a non-limiting example, the magnesium part 12 is formed from substantially pure magnesium (i.e., magnesium having less than about 0.1% of impurities) or a magnesium alloy. Non-limiting examples of magnesium alloys include magnesium-aluminum alloys, magnesium-zinc alloys, magnesium-manganese alloys, magnesium-zirconium alloys, magnesium-rare earth element alloys, and/or the like. The other part 16 is also formed from substantially pure magnesium, a magnesium alloy selected from those listed immediately above, pure aluminum, or an aluminum alloy.

The fastener 14 joining the magnesium part 12 to the other part 16 may be selected from any suitable fastener, non-limiting examples of which include rivets, bolts, and/or the like, and/or combinations thereof. In some instances, the fastener 14 may be associated with a part 15 such as, for example, washers, nuts, and/or the like. Such fasteners 14 or parts 15 associated with the fastener 14 are made from, for example, steel, galvanized steel, aluminum alloys, copper alloys, or combinations thereof.

The method of reducing corrosion at the interface 10 formed between the magnesium part 12 and the fastener 14 includes cold spraying a corrosion protection material 20 at least on the interface 10. More specifically, the magnesium part 12 and the other part 16 are joined together by the fastener 14, and then the corrosion protection material 20 is cold sprayed on at least a portion of the interface 10 (e.g., exposed portions of the interface 10). In some instances, the corrosion protection material 20 is cold sprayed on each exposed surface of the fastener 14 and an area surrounding the interface 10. This area is typically at least a portion of the surface 22 of the magnesium part 12 within, for example, from about 10 mm to about 20 mm from the interface 10. The resultant article 22 includes the parts 12, 16 joined by the fastener 14, which is substantially protected from corrosion via the layer of the corrosion protection material 20 established thereon.

In an embodiment, the corrosion protection material 20 is cold sprayed at a temperature ranging from about 20° C. (e.g., room temperature) to about 300° C. In another embodiment, the layer of the corrosion protection material 20 formed from cold spraying has a thickness ranging from about 1 μm to about 5 mm.

The corrosion protection material 20 generally includes at least magnesium. In a non-limiting example, the corrosion protection material 20 is a powder formed from substantially pure magnesium (i.e., having less than about 0.1% impurities). In another non-limiting example, the corrosion protection material 20 is a powder formed from a magnesium alloy, examples of which include magnesium-aluminum alloys, magnesium-zinc alloys, magnesium-manganese alloys, magnesium-zirconium alloys, magnesium-rare earth element alloys, magnesium-titanium alloys, and/or the like, and/or combinations thereof. In yet another example, the corrosion protection material 20 may include a mixture of the foregoing materials and other non-metallic particles, examples of which include oxides (e.g., of magnesium, aluminum, tin, or copper), hydroxides (e.g., of magnesium, aluminum, tin, or copper), salts (e.g., of magnesium, aluminum, tin, or copper), and/or the like, and/or combinations thereof.

It is to be understood that, in this example, the material selected for the corrosion protection material 20 is substantially the same as the material selected for the magnesium part 12. For example, the corrosion protection material 20 is substantially pure magnesium when the magnesium part 12 is also formed from substantially pure magnesium. Likewise, the corrosion protection material 20 is a magnesium alloy when the magnesium part 12 is also formed from a magnesium alloy. It is further to be understood that the corrosion protection material 20 does not necessarily have to be the same material as that selected for the magnesium part 12. For example, a magnesium-aluminum alloy as the corrosion protection material 20 may be cold sprayed on a magnesium-zinc alloy part 12.

The corrosion protection material 20 generally bonds to the magnesium-containing part 12 when the corrosion protection material 20 is cold sprayed on at least the exposed portion of the interface 10. In some instances, the corrosion protection material 20 is also cold sprayed on areas of the magnesium part 12 surrounding the interface 10. Without being bound by any theory, it is believed that this is due, at least in part, to intermolecular Van der Waals forces between the corrosion protection material 20 and the magnesium part 12, as well as partial melting of the magnesium at the interface 10 during cold spraying. The partial melting of the magnesium at the interface 10 is due, at least in part, to heat generated from the magnesium particles impacting the part 12 surface at ultrasonic speeds from the cold spray. It is also believed that the corrosion protection material 20 may suitably adhere to and/or be positioned over the fastener 14 as well. Such adherence and/or positioning is accomplished by the material 20 being established at least over the fastener 14 (and in some instances over the magnesium part 12 at areas surrounding the interface 10) and forming a bond with i) the fastener 14, and ii) portions of the magnesium part 12 adjacent to the fastener 14.

It is further to be understood that corrosion may also occur between the layer of the corrosion protection material 20 and the fastener 14. In this case, one or more additional corrosion protection layers (not shown) may be applied or otherwise formed over the corrosion protection material 20, at least a portion of the magnesium part 12, or combinations thereof. For example, the additional corrosion protection layer(s) may be anodized coating(s) typically used for corrosion protection of magnesium alloys. Non-limiting examples of such anodized coating(s) include Keronite coatings, Tagnite coating, and/or the like, and/or combinations thereof.

Figure 2A:
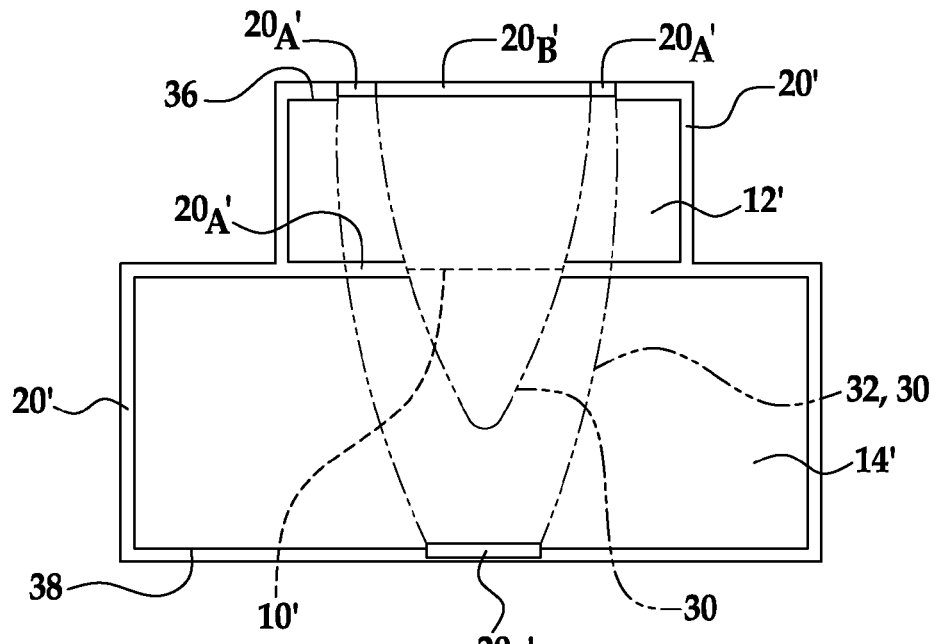
FIGS. 2A and 2B are schematic, cross-sectional depictions of magnesium and another metal, each having a corrosion protection material thereon, after being welded together in two different configurations.
Figure 2B:
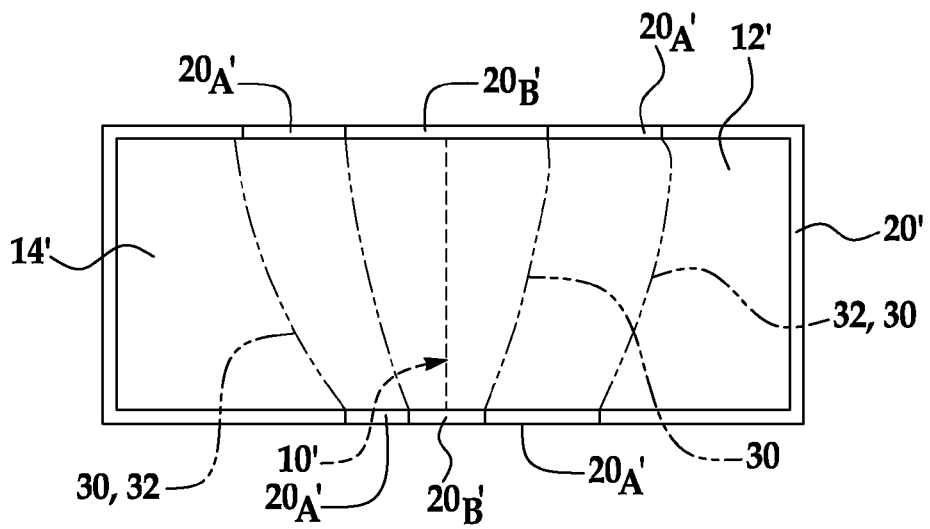
Figure 3A:
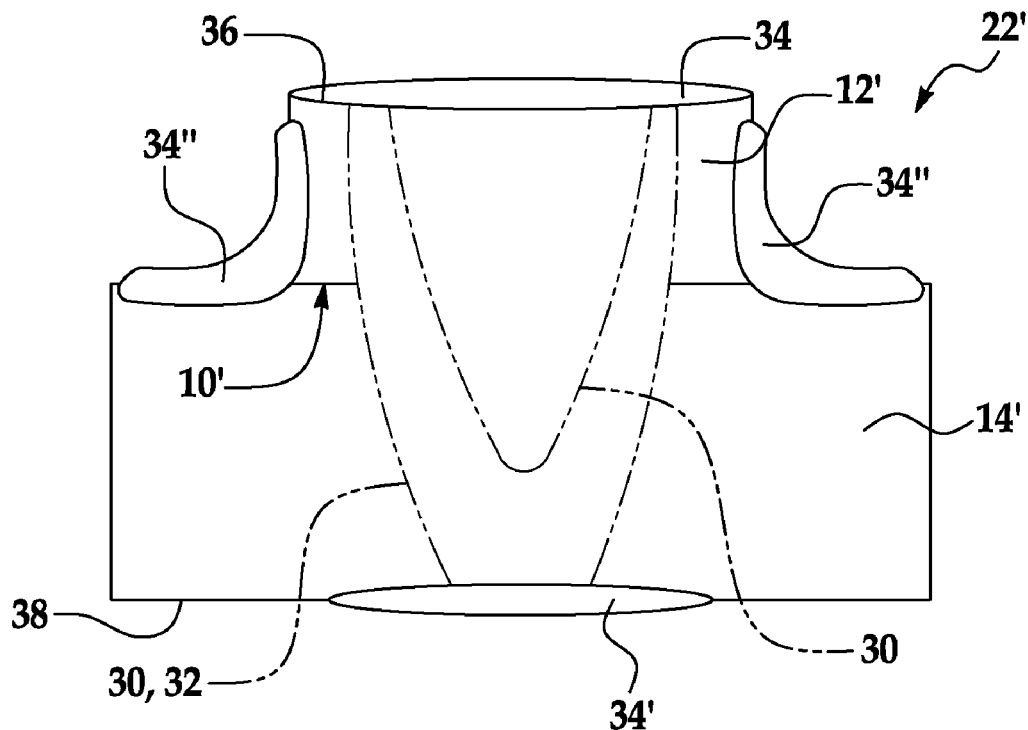
FIGS. 3A and 3B are schematic, cross-sectional depictions of other examples of methods of reducing corrosion at an interface formed between magnesium and another metal.
Figure 3B:
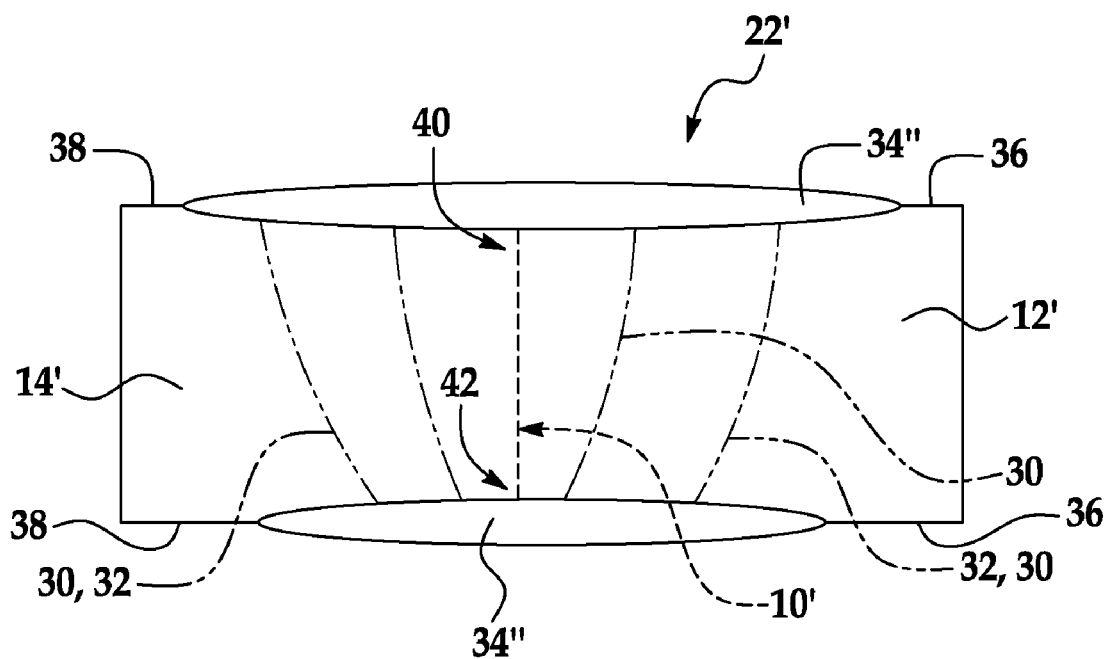

Other examples of the method of reducing corrosion at an interface formed between dissimilar metals are depicted in FIGS. 2A and 2B and in FIGS. 3A and 3B. In these examples, corrosion is reduced at an interface formed between a magnesium-containing metal welded to another metal. The magnesium-containing metal 12' may be substantially pure magnesium (i.e., having less than about 0.1% impurities) or a magnesium alloy. Non-limiting examples of magnesium alloys include magnesium-aluminum alloys, magnesium-zinc alloys, magnesium-manganese alloys, magnesium-zirconium alloys, magnesium-cerium alloys, magnesium-rare earth element alloys, and/or the like. Examples of the other metal include, but are not limited to, aluminum, an aluminum alloy, zinc, a zinc alloy, steel, galvanized steel, copper, a copper alloy, and/or the like, and/or combinations thereof.

It is generally to be understood that some metals (e.g., aluminum or copper) tend to be relatively incompatible with magnesium and alloys thereof, and that during the welding process, galvanic corrosion of the magnesium or magnesium alloy may occur (i.e., anode corrosion). Additionally, due at least in part to a relatively high alkalinity of corrosion products of the magnesium or the magnesium alloy, the other metal in contact with the magnesium or magnesium alloy may dissolve, resulting in cathodic corrosion of the other metal.

The method of reducing the foregoing corrosion effects shown in FIGS. 2A through 3B includes welding a magnesium-containing metal 12' and another metal 14' to form the welded joint (also referred to herein as an interface 10') between the magnesium-containing metal 12' and the other metal 14'. The magnesium-containing metal 12' and the other metal 14' may form a lap joint (as depicted in FIGS. 2A and 3A) or a butt joint (as depicted in FIGS. 2B and 3B). The welding process causes at least one heat affected area 30 to form adjacent to the interface 10' of the joined metals 12', 14'. Portions of the heat affected area(s) 30 include mixed area(s) 32 which include a mixed composition of the magnesium-containing metal and the other metal.

Referring now FIGS. 2A and 2B, the method of reducing corrosion includes adding a corrosion protection material/layer 20' to the surfaces of the metals 12', 14' prior to welding. FIGS. 2A and 2B illustrate the joined metals 12', 14' after welding has occurred.

FIG. 2A illustrates a magnesium-containing metal 12' and another metal 14' welded together to form a lap joint, and FIG. 2B illustrates the metal 12' and other metal 14' welded together to form a butt joint. The corrosion protection material/layer 20' is established on the respective parts 12', 14' prior to welding. It is to be understood that the corrosion protection layer 20' suitably prevents corrosion of the magnesium-containing metal 12' at the interface 10', however the corrosion protection layer 20' used in the embodiment depicted in FIGS. 2A and 2B is different from the corrosion protection material 20 depicted in the embodiment depicted in FIG. 1. Establishing the material/layer 20' may be accomplished by treating the desirable surfaces to form the coating, or by depositing the coating on the desirable surfaces. In an embodiment, each surface of the magnesium containing-metal 12' and/or each surface of the other metal 14' is treated to form the layer of the corrosion protection material/layer 20' thereon. In the example depicted in FIGS. 2A and 2B, the entire exterior surface 36 of the magnesium-containing metal 12' is treated to form the corrosion protection material/layer 20', and the entire exterior surface 38 of the other metal 14' is also treated to form the corrosion protection material/layer 20' thereon. Since the corrosion protection layers 20' are formed prior to welding, each surface of the respective metals 12', 14' may be treated. However, the corrosion protection material 20' layers may also be selectively formed at some surfaces of the respective metals 12', 14', while other surfaces remain uncoated.

It is believed that the welding process may slightly damage portions $20'_A$ of the layer 20', severely damage portions $20'_B$ of the layer 20', and/or entirely degrade portions of the layer 20' (e.g., at the interface 10', material 20' no longer exists). Such damage to the corrosion protection layer 20' generally occurs at the heat affected zones 30, 32. Even though the corrosion protection layer 20' may be damaged or removed as a result of welding, the material/layer 20' still protects the underlying metals 12', 14' from being corroded.

In addition to including the corrosion protection layer 20' on the metals 12', 14', it may be desirable to further protect the dissimilar metals 12', 14' from galvanic corrosion. As described further herein below, such additional protection may be accomplished by adding one or more cladding layers after welding. It is to be understood that the cladding layers described herein below are generally incorporated over the corrosion protection layer 20' (including over damaged portions $20'_A$, $20'_B$). Furthermore, for clarity, the layer 20' has been removed from FIGS. 3A and 3B for clarity.

Referring now to the example shown in FIG. 3A, after the magnesium-containing metal 12' and the other metal 14' (having the having a corrosion protection material 20' layer thereon) are welded together, i) a cladding layer 34 is applied to a surface 36 of the magnesium-containing metal 12' proximate to the heat affected area(s) 30, ii) a cladding layer 34' is applied to a surface 38 of the other metal 14' proximate to the heat affected area(s) 30, and iii) a cladding layer 34" is applied adjacent to the interface or welded joint 10'.

While the corrosion protection material 20' is not shown in FIG. 3A, it is to be understood that the cladding layer 34 is applied to the surface 36 of the magnesium-containing metal 12' at least at an area where the corrosion protection material $20'_A$, $20'_B$ has been damaged/degraded due to welding. The cladding layer 34 has substantially the same composition as the magnesium-containing metal 12'.

Similarly, the cladding layer 34' applied to at least a portion of the surface 38 of the other metal 14' has substantially the same composition as the other metal 14'. Again, while the corrosion protection material 20' is not shown in FIG. 3A, it is to be understood that the cladding layer 34' is applied to the surface 38 of the other metal 14' at least at an area where the corrosion protection material $20'_A$ has been damaged/degraded due to welding.

The laser cladding layer 34" is applied adjacent to the interface or welded joint 10' such that a portion of the cladding layer 34" abuts the magnesium-containing metal 12' and another portion of the cladding layer 34" abuts the other metal 14'. The composition of the laser cladding layer 34" transitions from a first composition, which is the same composition as the magnesium-containing metal 12', to a second composition, which is the same composition as the other metal 14'. For example, the portion of the cladding layer 34" containing the first composition abuts the magnesium-containing metal part 12', while the portion of the cladding layer 34" containing the second composition including the other metal abuts the other metal part 14'.

In the example shown in FIG. 3B, a cladding layer 34" is applied to the first side 40 of the interface 10' and adjacent to the heat affect zones 30, 32, and a cladding layer 34" is also applied to the second side 42 of the interface 10' and adjacent to the heat affected zones 30, 32. More specifically, while the corrosion protection material 20', $20'_A$, $20'_B$ is not shown in FIG. 3B, it is to be understood that the cladding layers 34" are applied to the surfaces 36, 38 of the metals 12', 14' at least at areas where the corrosion protection material $20'_A$, $20'_B$ has been damaged/degraded due to welding. One of the cladding layers 34" is disposed on a portion of the surface 36 of the magnesium-containing metal 12' and a portion of the surface 38 of the other metal 14' adjacent to the first side 40 of the interface 10', and the other cladding layer 34" is disposed on a portion of the surface 36 of the magnesium-containing metal 12' and a portion of the surface 38 of the other metal 14' adjacent to the second side 42 of the interface 10'. Similar to the cladding layer 34" described above in conjunction with the example depicted in FIG. 3A, the cladding layers 34" also have varying composition. The composition of the cladding layers 34" adjacent to the metal 12' is the same as the metal 12', while the composition of the cladding layers 34" adjacent to the other metal 14' is the same as the other metal 14'.

Without being bound by any theory, it is believed that by completely covering the heat affected area(s) 30, 32 with one of the cladding layers 34, 34', 34", corrosion of the magnesium-containing metal 12' and the other metal 14' at welded areas, particularly at the interface 10', is substantially reduced or eliminated. It is further believed that, at the interface 10', the cladding layer 34" substantially seals the interface 10' so that corrosive species cannot contact any gaps formed between the magnesium-containing metal 12' and the other metal 14' and initiate electrochemical reactions that would otherwise result in at least one of galvanic corrosion or cathodic corrosion. It is also believed that the cladding layers 34, 34' prevent corrosion from occurring at the surfaces 36, 38, respectively, surrounding the heat affected area(s) 30, 32.

It is to be understood that the cladding layer 34" used in either of the embodiments depicted in FIGS. 3A and 3B should be large enough so that a gradient of the transient composition is relatively smooth from the first composition to the second composition. It is to be understood that the size of the cladding layer 34" is generally dependent, at least in part, on an electrochemical difference between the magnesium-containing metal 12' and the other metal 14'. For example, if the electrochemical difference between the metals 12', 14' is substantially large, then the cladding layer 34" would also be large. This smooth gradient contributes to reducing any galvanic effects due, at least in part, to differences in composition in the cladding layer 34". If a galvanic effect does occur, for example, its affects will be uniformly distributed over a large surface area of the cladding layer 34" and it is believed that this will not lead to severe corrosion that is localized at the interface 10'.

While several embodiments have been described in detail, it will be apparent to those skilled in the art that the disclosed embodiments may be modified. Therefore, the foregoing description is to be considered exemplary rather than limiting.

The invention claimed is:

1. A method for reducing corrosion at an interface formed between at least one of a fastener and a magnesium part or a part associated with the fastener and the magnesium part, the magnesium part being formed from substantially pure magnesium or a magnesium alloy, the method comprising cold spraying a corrosion protection material at least on the interface, the corrosion protection material being formed from substantially pure magnesium or a magnesium alloy;

wherein the corrosion protection material is substantially pure magnesium when the magnesium part is formed from substantially pure magnesium, and wherein the corrosion protection material is a magnesium alloy when the magnesium part is formed from a magnesium alloy.

2. The method as defined in claim 1 wherein the fastener is selected from rivets, bolts, and combinations thereof, and wherein the part associated with the fastener is selected from nuts, washers, and combinations thereof.

3. The method as defined in claim 1 wherein the fastener or the part associated with the fastener is formed from steel, galvanized steel, aluminum alloys, copper alloys, or combinations thereof.

4. The method as defined in claim 1 wherein the corrosion protection material substantially pure magnesium is a magnesium powder and the magnesium alloy is a corrosion protection material magnesium alloy powder.

5. The method as defined in claim 4 wherein the corrosion protection material further includes non-metallic particles.

6. The method as defined in claim 1, further comprising cold spraying the fastener and an area surrounding the interface with the corrosion protection material.

7. The method as defined in claim 1 wherein the corrosion protection material bonds to the fastener, the part associated with the fastener, the magnesium part, or combinations thereof.

8. The method as defined in claim 1, further comprising applying at least one corrosion protection layer over the corrosion protection material, at least a portion of the magnesium part, or combinations thereof.

9. The method as defined in claim 1, further comprising one of applying or forming an additional corrosion protection material over the corrosion protection material, the additional corrosion protection material being an anodized coating.

* * * * *